United States Patent
Kinoshita et al.

[11] Patent Number: 5,850,243
[45] Date of Patent: Dec. 15, 1998

[54] RECORDING APPARATUS INCLUDING DETACHABLE RECORDING UNIT

[75] Inventors: Hiroyuki Kinoshita; Junichi Asano, both of Kawasaki; Soichi Hiramatsu, Hachioji; Haruyuki Yanagi, Machida; Hideaki Kawakami, Yokohama, all of Japan

[73] Assignee: Canon Kabushiki Kaisha, Tokyo, Japan

[21] Appl. No.: 873,749

[22] Filed: Jun. 12, 1997

Related U.S. Application Data

[63] Continuation of Ser. No. 733,995, Oct. 16, 1996, abandoned, which is a continuation of Ser. No. 287,414, Aug. 9, 1994, abandoned.

[30] Foreign Application Priority Data

Aug. 10, 1993 [JP] Japan ................................ 5-198542

[51] Int. Cl.$^6$ .................................. B41J 2/01; H02J 1/00
[52] U.S. Cl. ............................ 347/108; 347/5; 347/109; 307/43; 307/85; 307/86; 400/88
[58] Field of Search .............................. 400/88; 307/43, 307/85, 86; 347/108, 109, 5

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,586,838 | 5/1986 | Hara et al. ................................ 400/88 |
| 4,608,577 | 8/1986 | Hori . |
| 4,723,129 | 2/1988 | Endo et al. . |
| 4,740,796 | 4/1988 | Endo et al. . |
| 4,759,646 | 7/1988 | Piatt .......................................... 400/88 |
| 5,306,956 | 4/1994 | Ikeda et al. ............................... 307/85 |
| 5,320,436 | 6/1994 | Hock et al. ............................. 347/108 |

FOREIGN PATENT DOCUMENTS

| | | |
|---|---|---|
| 0540301A2 | 5/1993 | European Pat. Off. ................ 347/108 |
| 54-056847 | 5/1979 | Japan . |
| 59-123670 | 7/1984 | Japan . |
| 59-138461 | 8/1984 | Japan . |
| 60-071260 | 4/1985 | Japan . |
| 4096628 | 3/1992 | Japan . |
| 4096370 | 8/1992 | Japan . |

Primary Examiner—Valerie Lund
Attorney, Agent, or Firm—Fitzpatrick, Cella, Harper & Scinto

[57] ABSTRACT

In a recording apparatus such as an ink jet type recording apparatus, there are provided a recording unit for performing a recording operation on a recording material in response to a recording signal, the recording unit having a power supply for supplying power to drive the same, and a feeding unit for automatically feeding the recording material to the recording unit. This feeding unit is detachably connected to the recording unit. The recording apparatus further comprises a power supply apparatus installed on the feeding unit, capable of supplying power to the recording unit under such a condition that the feeding unit is connected to the recording unit. The recording unit can be made compact and lightweight. The recording unit is solely operable as a portable recording unit.

69 Claims, 8 Drawing Sheets

RECORDING APPARATUS INCLUDING DETACHABLE RECORDING UNIT

This application is a continuation of application Ser. No. 08/733,995 filed Oct. 16, 1996, now abandoned, which is a continuation of application Ser. No. 08/287,414 filed Aug. 9, 1994, abandoned.

BACKGROUND OF THE INVENTION

1. Field of the Invention

The present invention generally relates to a recording apparatus for forming a character and an image on a recording material. More specifically, the present invention is directed to an ink jet type recording apparatus including a detachable compact recording unit.

2. Description of Related Art

In various recording apparatuses equipped with functions of printers, copying machines, and facsimile receivers, and also such a recording apparatus employed as an output unit of a workstation for a composite type electronic apparatus including a computer and a wordprocessor, characters and images are recorded on a recording material (will be referred to a "recording sheet" hereinafter) made of paper or a plastic thin plate in response to recording information. Typically, these recording apparatuses are classified into the ink jet type recording system, wired dot type recording system, thermal type recording system, and laser beam type recording system. In a serial scanning type recording apparatus that the main scanning operation is performed along the direction intersected with the transporting direction (sub-scanning direction) of the recording sheet, the recording operation (main scanning direction) is carried out by a recording means (recording head) mounted on a carriage transported along the recording sheet based on the content of recording data, and the recording sheet is transported at a predetermined distance (i.e., pitch transport) every time the recording operation for 1 line is complete. Furthermore, the recording operation (main scanning operation) for the subsequent line is carried out for the recording sheet which is again held under stopping condition. Then, such a recording operation is repeatedly performed, so that the recording operation for the overall recording sheet is accomplished. On the other hand, in a line type recording apparatus that only the recording sheet is transported along the transport direction to perform the recording operation, the recording sheet is set to a predetermined recording position. After the recording operation for 1 line has been wholly performed by the recording head, a predetermined amount of recording sheet feeding is performed. Furthermore, the recording operation for another 1 line is wholly performed, and such a 1-line recording operation is repeatedly carried out to record the information on the entire recording sheet.

Among these recording apparatuses, an ink jet type recording apparatus ejects ink from a recording head toward a recording sheet to record information on this recording sheet. This ink jet type recording apparatus has various merits such as the recording means can be made compact, and further can record an image in high precision and at high speed. Furthermore, an image can be recorded on a normal paper sheet without any specific process, the running cost is low, and recording operation can be done with low noise because of the non-impact type recording system, and moreover a color image can be easily recorded by using multicolor ink. Higher speed recording operation is available in the line type recording apparatus with employment of the line type recording head constructed such that a large number of ink jet orifices are arranged along the sheet width direction.

In particular, the ink jet type recording head for ejecting ink by utilizing thermal energy may be readily manufactured with employment of the semiconductor manufacturing process such as etching, vapor deposition, and sputtering, with electrothermal converting members in the film form, electrodes, fluid path walls, and a ceiling plate being fabricated on a substrate, whereby the resultant recording head has such an arrangement of fluid paths and ink jet orifices at high density. Accordingly, a more compact recording head may be manufactured. On the other hand, various needs are made for materials of a recording member. That is, very recently thin paper and processed paper (punched paper for filing, perforated paper, and paper with arbitrary shapes) may be utilized in addition to a normal recording paper sheet and a resin thin film (for OHP etc.).

In FIG. 6, there is schematically shown an example of the conventional ink jet type recording apparatus. Reference numeral 101 indicates a recording head mounted on a carriage 102, for performing a recording operation while ejecting ink toward a recording sheet from ink ejecting orifices arranged on an ink ejecting surface 101A thereof. Reference numeral 103 shows a guide rod for guiding the carriage 102 along the recording sheet S. Reference numeral 104 denotes a timing belt driven by a carriage motor 105 and for transporting the carriage 102. The recording sheet S is mounted on an automatic sheet feeder (ASF) 106 in this case, and is sequentially transported to the position of a sheet feed roller 107 one by one by way of a feed roller (not shown in detail). Accordingly, the recording sheet S held under such a condition that this sheet is pressure-depressed against the sheet feed roller 107 by pinch rollers 108, is conducted to a position located opposite to the ink ejecting orifices of the recording head by rotating the sheet feed roller 107. At this position, the recording operation is performed by ejecting the ink from the ink ejecting orifices of the recording head 101 toward the recording sheet S while the main scanning operation by the carriage 102 is performed. Thereafter, this recorded sheet S is transported, and after the recording information for one page has been recorded on the recording sheet S, the resultant recording sheet S is discharged from this recording apparatus.

Reference numeral 110 shows a wiper provided outside the recording region, for wiping the ink ejecting surface 101A of the recording head 101. This wiper 110 wipes out unnecessary articles such as paper dust and dirt attached on the ink ejecting surface 101A of the recording head 101 which is guided from the carriage 102 to this above position. Reference numeral 111 indicates cap means for recovering to prevent a clogging phenomenon by sucking ink from the recording head 101A and also preventing evaporation of the ink from the recording head by covering the ejecting surface 101A.

FIG. 7 schematically shows a structure of an ink ejecting section of the recording head 101. As shown in FIG. 7, a plurality of jetting ports 101B are formed at a predetermined pitch on the ink ejecting surface 101A while keeping a preselected space (for instance, on the order of 0.5 to 2.0 mm) from the recording sheet. An electric/thermal converting member (heating resistor) 101E for producing ink ejecting energy is arranged along a wall of the respective fluid paths 101D which communicate with a common fluid chamber 101C and the respective ejecting orifices 101B. It should be noted in this example that the recording head 101 is mounted on the carriage 102 in such a manner that the ink ejecting orifices 101B are arranged along the direction intersected with the scanning direction of this carriage. Thus, the electric/thermal converting members 101E are selectively driven in the recording head 101 in response to either the image signal, or the ink ejecting signal. Then, the ink stored in the fluid path 101D is film boiled and the ink is ejected from the ink ejecting orifice 101B by utilizing pressure produced from this film boiling.

Very recently, strong needs are made of such recording apparatuses in view of compactness, portability, and operability. Namely, more compact and highly operable recording apparatuses are required. To achieve these requirements, a feeding unit such as an ASF is separated from a recording unit, and only the separated recording unit is designed as a portable type recording unit.

However, there is a difficulty to satisfy both of portability and operability at the same time. In particular, when portability of the recording unit constitutes a major function, the recording unit must be made compact and lightweight, so that such a heavy battery having a large capacity cannot be employed in this compact recording unit. As a consequence, power consumption of a cell employed in the recording unit must be lowered, so that the recording functions thereof should be necessarily lowered.

SUMMARY OF THE INVENTION

The present invention has been made in an attempt to solve the above-explained problems, and therefore, has an object to provide such a recording apparatus whose recording unit is made compact and also light-weight.

Another object of the present invention is to provide such a recording apparatus in which only a recording unit is independently operable as a portable type recording apparatus.

A further object of the present invention is to provide such a recording apparatus that a recording unit can be readily coupled with a feeding unit to function as an installation type recording apparatus.

To achieve the above-described objects, a recording apparatus according to one aspect of the present invention, comprises:

a recording unit including means for achieving a function capable of performing a recording operation on a recording material in response to a recording signal, and a power supply for supplying power to drive the means;

a feeding unit including means for achieving a function capable of automatically feeding the recording material to the recording unit, the feeding unit being detachably connected to the recording unit; and a power supply apparatus installed on the feeding unit, capable of supplying power to the recording unit under such a condition that the feeding unit is connecting the recording unit.

Here, the power supply of the recording unit may be a battery, and the power supply apparatus may be a battery, the supply voltage of which may be higher than that of the recording unit battery, and the capacity of which may be larger than that of the recording unit battery.

The power supply apparatus may be a constant voltage supply apparatus whose supply voltage is controlled to a predetermined constant voltage by an AC-to-DC converter connected to a household AC power source.

The recording apparatus may comprise switching means for changing the power supply of the recording function achieving means from the power supply of the recording unit into the power supply apparatus of the feeding apparatus under the connecting condition.

The recording apparatus may comprise recharging means for recharging the battery of the recording unit by the power supply apparatus of the feeding unit under the connecting condition between the recording unit and the feeding unit.

The recording apparatus may comprise recording operation mode switching means for switching a recording operation mode under which the recording unit is solely utilized, and another recording operation mode under which the recording unit is used together with the feeding unit under the connecting condition.

The recording operation mode switching means may change a recording speed.

The recording operation mode switching means may change recording density.

The recording apparatus may comprise means for transmitting/receiving a signal derived from the host apparatus to/from the recording unit under the connecting condition between the feeding unit and the recording unit.

The feeding unit may comprise a receiving buffer for temporarily storing the signal derived from the host apparatus.

The means for transmitting/receiving the signal derived from the host apparatus to/from the recording unit may be a receiving unit for receiving the signal in the form of a radio signal.

The feeding unit may own a function as a tractor feeder.

The recording unit may comprise an ink jet recording head for ejecting ink onto the recording material to perform the recording operation.

The ink jet recording head may comprise an electrothermal converting member for producing heat energy used to eject ink.

The ink jet recording head may eject the ink from ink ejecting orifices by utilizing film boiling occurring in the ink in response to heat energy produced from the electrothermal converting member.

In accordance with the present invention, the recording unit may be solely used as a portable type recording apparatus. Furthermore, since this recording unit is mounted on the feeding unit, the overall unit may be used as an installation type recording apparatus capable of supplying drive power via the feeding unit to the recording unit, and also capable of automatically feeding the recording sheets. As a consequence, when the recording unit is solely used, the recording operation may be achieved under low power consumption. When the recording unit is combined with the feeding unit, the recording operation with higher functions may be achieved without taking care of such high power consumption. Moreover, the recording unit may be easily detached from the feeding unit, and in particular, this recording unit can be made compact and light-weight, so that this recording unit is operable as a portable unit.

The above and other objects, effects, features and advantages of the present invention will become more apparent from the following description of embodiments thereof taken in conjunction with the accompanying drawings.

BRIEF DESCRIPTION OF THE DRAWINGS

The above object and other objects, features and advantages of the present invention will be readily appreciated by one of ordinary skill in the art from the following detailed description of the best mode for carrying out the invention when taken in connection with the accompanying drawings, in which.

DETAILED DESCRIPTION OF THE PREFERRED EMBODIMENT

Figure 1:
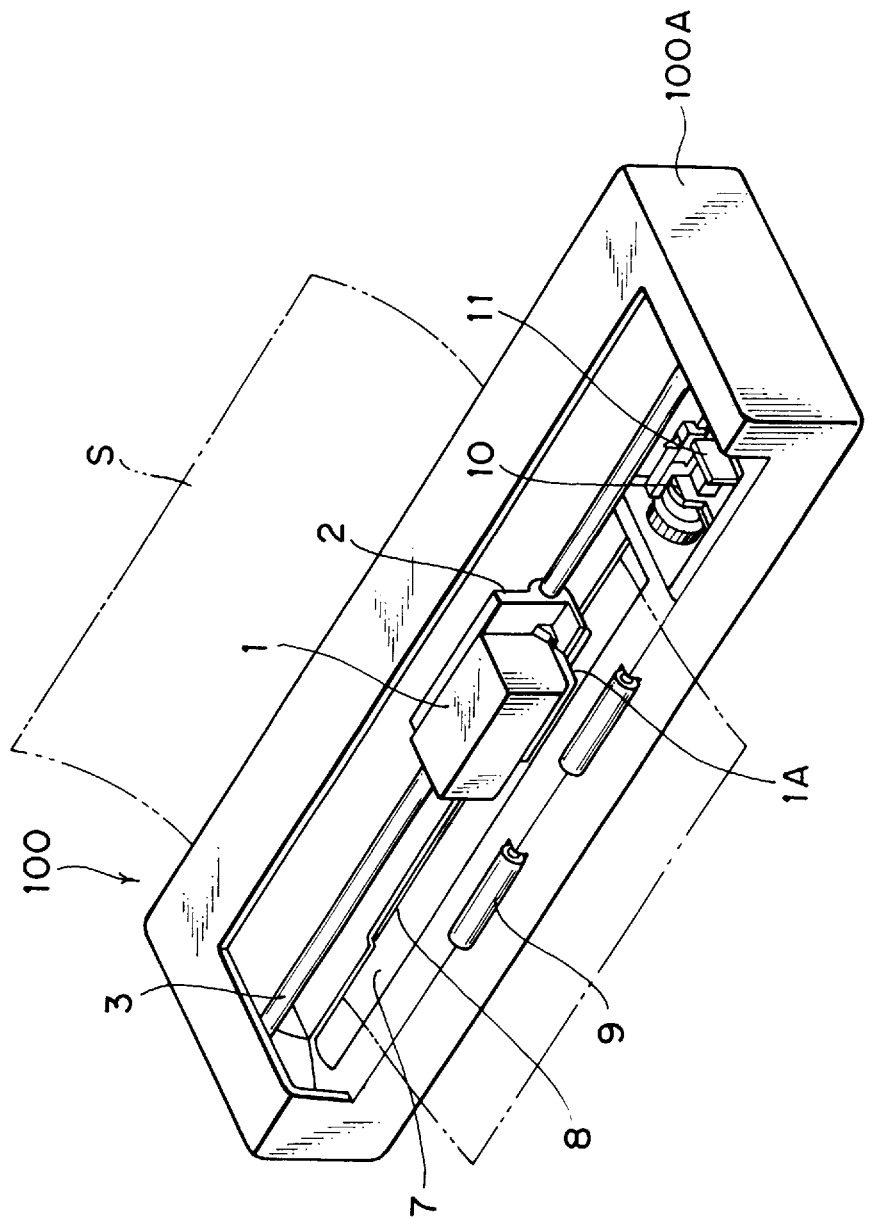
FIG. 1 is a perspective view for showing a structure of a recording unit according to the present invention.

Referring now to the drawings, various embodiments of the present invention will be described in detail and more concretely.

Figure 2:
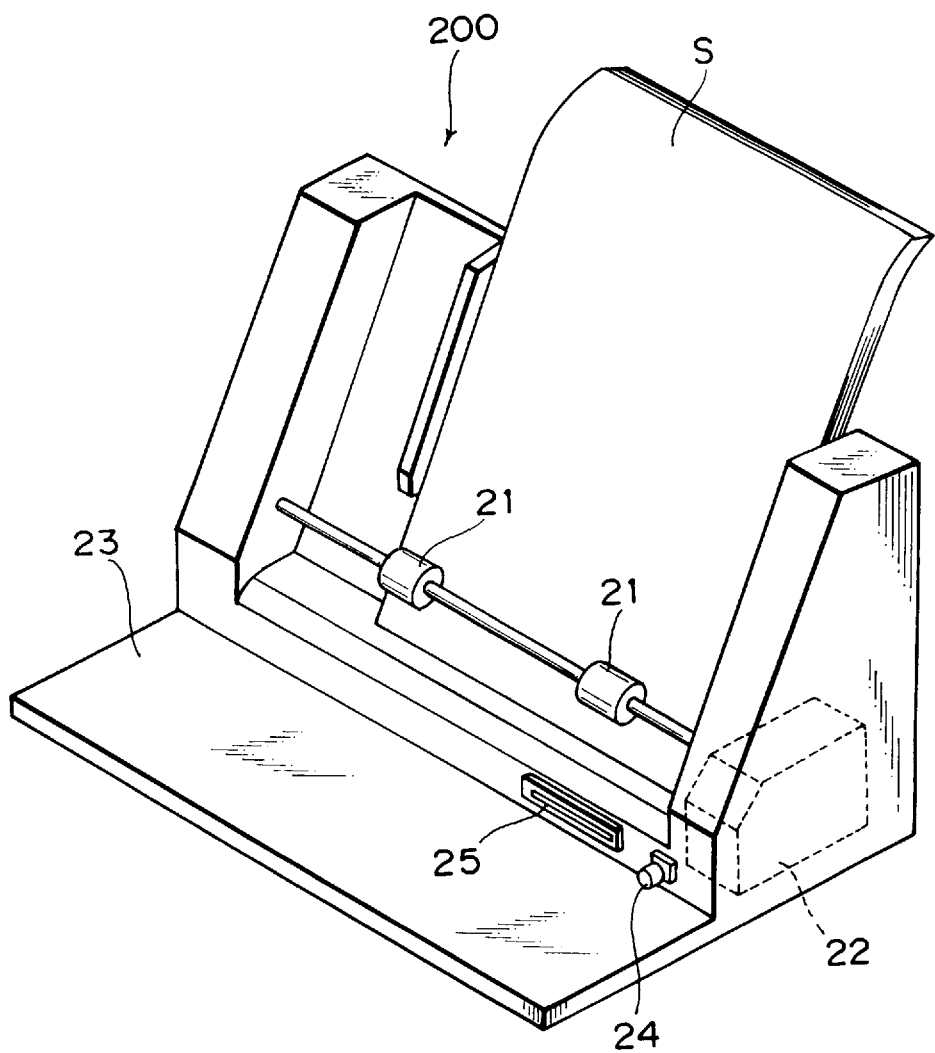
FIG. 2 is a perspective view for representing a structure of a feeding unit according to the present invention.
Figure 3:
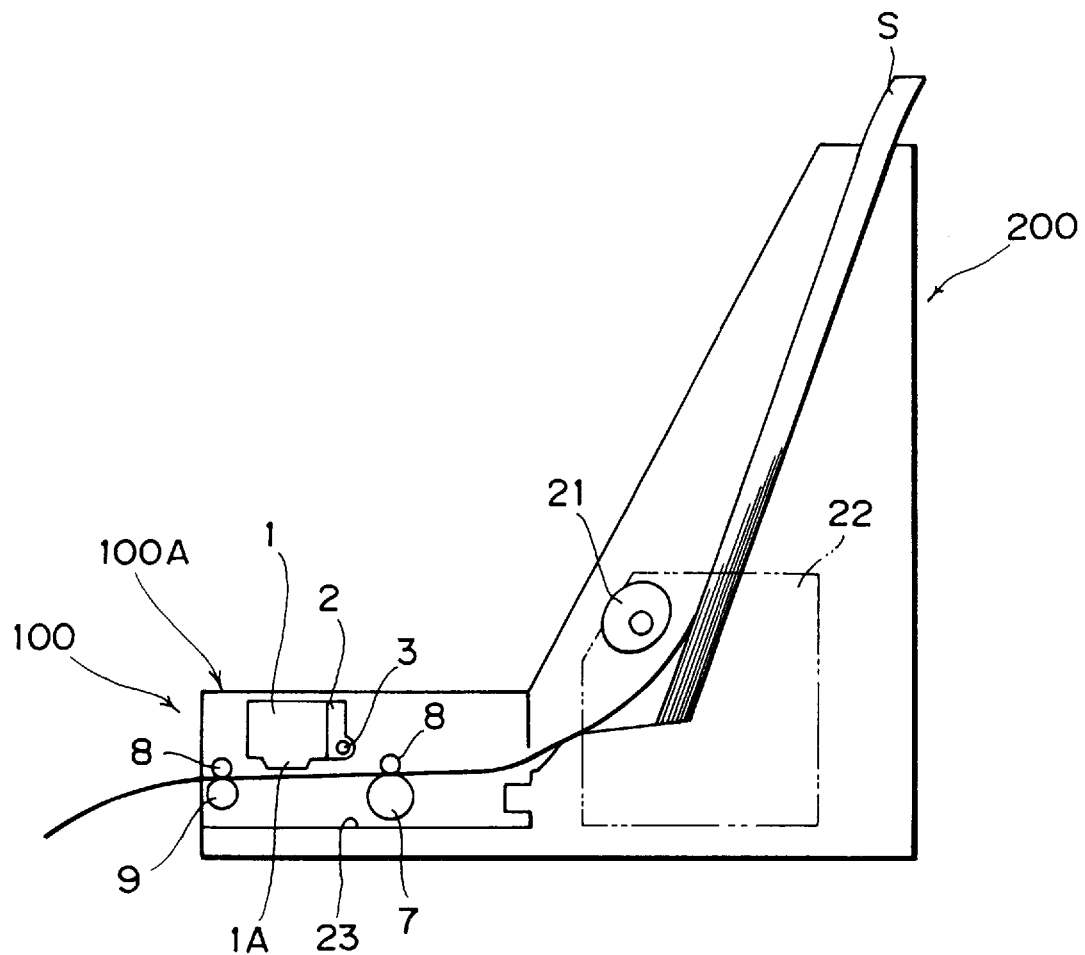
FIG. 3 is a sectional view for schematically representing an arrangement of an ink jet type recording apparatus according to a first embodiment, to which the present invention is applied.

In FIG. 1 to FIG. 3 and FIG. 8, there is shown a recording apparatus according to an embodiment of the present invention. FIG. 1 schematically indicates a recording unit independently having a recording function. FIG. 2 schematically represents a feeding unit having an ASF (automatic sheet feeding) function and furthermore an interface unit for transferring/receiving a recording signal from a power supply and a host unit. FIG. 3 schematically shows a concept of an ink jet type recording apparatus according to the present invention, in which the above-described recording unit and feeding unit are coupled to each other to construct an installation type recording apparatus.

In FIG. 1, reference numeral 100 indicates a recording unit. The recording unit 100 is comprised of a recording head 1 functioning as a recording means R for performing the recording operation by ejecting ink from ink ejecting orifices of an ink ejecting surface 1A, a carriage 2 for mounting the recording head 1 thereon, a guide rod 3 for guiding the carriage 2, and a drive means A including a timing belt (not shown) used to drive the carriage 2, and a motor for driving this timing belt. The recording unit 100 further comprises another drive means B containing a sheet feed roller 7, pinch rollers 8, and an discharging roller 9 for conducting a recording sheet S to the recording position, and also a motor for driving these members. It should be noted that in the recording unit 100, most of the above-described members are arranged within a recording unit case 100A, and a control circuit C for controlling the above-described recording means R, drive means A, and drive means B, and further a rechargeable battery D for the recording unit are arranged. The recording operation may be preformed for the recording sheet S which has been inserted into a sheet insertion port (not shown) by driving the respective members and circuits by way of either the rechargeable battery D mounted within this recording unit 100, or an external power supply (will be described later).

When the recording unit 100 is independently used, this recording unit 100 is directly connected to a host apparatus 300 to perform the recording operation. At this time, the large capacity of the rechargeable battery D employed within the recording unit 100 is not available because of its heavy weight, taking account of portability of this recording unit 100, so that the drive means A for the carriage 2 and the drive means B for the sheet feed roller 7 are operated at low speeds. Furthermore, the recording operation by the recording means R is performed under such a low resolution printing mode that the number of recording dots per unit is reduced, so that power consumption is suppressed as low as possible. It should be noted that the above-described recording unit 100 may be substituted by such a recording unit equipped with the wordprocessing function and the like, capable of performing its recording operation in response to the recording signal derived from the wordprocessor and the like.

Also, the recording operation may be realized for the recording sheet S which is automatically fed via the sheet insertion port from a feeding unit (will be discussed later) by mounting the recording unit 100 on this feeding unit. In this case, power may be supplied from the feeding unit to the recording unit 100, and also may be used to recharge the above-described rechargeable battery D. Referring back to FIG. 1, reference numeral 10 denotes a wiper for wiping out the ink ejecting surface 1A of the recording head 1, and reference numeral 11 indicates a cap means.

Subsequently, a description will now be made of the feeding unit 200 with reference to FIG. 2. This feeding unit 200 holds a plurality of recording sheets S in a stacked form, and is equipped with such an ASF (automatic sheet feeding) function by which the recording sheet S can be fed one by one to the recording unit 100 shown in FIG. 1 by way of a pick-up roller 21. The pick-up roller 21 is driven by a drive means E including a motor (not shown), and the drive operation is controlled by a feeding unit control circuit F. It should be understood that a recording material which is automatically fed may be selected as fan fold paper, and the feeding unit may have a function as a tractor feeder capable of automatically feeding the fan fold paper. Reference numeral 22 indicates such a power supply apparatus that corresponds to the driving power supply for the feeding unit 200 per se, and at the same time, may function as the driving power supply for the recording unit 100 when the feeding unit 200 is connected to the recording unit 100, as illustrated in FIG. 3. Furthermore, this power supply apparatus 22 may recharge the battery D employed within the recording unit 100. Reference numeral 23 shows a recording unit mounting member for supporting and fixing the recording unit 100, and reference numeral 24 indicates a power supply terminal for the recording unit 100. The control circuit F of the feeding unit 200 includes an interface unit (not shown) used to receive the recording signal and the like sent from an external host apparatus 300 such as a personal computer, and to transfer these signals to the recording unit. Reference numeral 25 denotes a connector unit for supplying and receiving the signals.

Now, a description will be made of the power supply apparatus 22. In accordance with one embodiment of the present invention, this power supply apparatus 22 may be a battery, or a cell similar to the battery D for the recording unit. It should be understood that the supply voltage of this power supply apparatus 22 is preferably selected to be higher than that of the recording unit battery D, and the capacity thereof may be larger than that of the recording unit battery D. In accordance with another embodiment of the present invention, as this power supply apparatus 22, a constant voltage supply apparatus may be employed which is connected to an AC power source for home appliances, and whose supply voltage is controlled by an AC-to-DC converter to become a preselected constant voltage higher than the supply voltage of the recording unit battery D. In the case that both voltages of the battery D and the power supply apparatus 22 are equal to each other, the recording unit 100 may have a transformer to rise the voltage supplied thereto.

As illustrated in FIG. 3, when the recording unit 100 is mounted on the feeding unit 200, which have been constructed with the above-described structures, they are operated in the using form of the installation type recording apparatus. It should be understood that in this case, both the power supply voltage and the signals are applied via the electric connection unit (namely, power supply terminal 24 and connector unit 25) of the feeding unit 200 to the recording unit 100, and the respective components in the recording unit 100 are driven by the power supply voltage from the feeding unit 200 and at the same time, the built-in battery D is recharged. At the signal connector unit 25, the signal derived from the host apparatus 300 is accepted and transferred, and also the control signal and the like are received and transmitted between the feeding unit 200 and the recording unit 100.

As described above, when the recording unit 100 is attached to the feeding unit 200, this attachment is sensed by a mechanical switch S1 operable in response to a pin or the like projected from the feeding unit 200, and then a control mode changing means C0 set to a recording unit control unit C is brought into an operating state. The control mode changing means C0 will switch an electronic switch S2 made of a semiconductor device thereby to apply the supply voltage of the power supply apparatus 22, which is higher than the supply voltage of the recording unit battery D, to such driven units as the recording means R, the drive means A, and the drive means B. Thus, these driven units are operable. At the same time, controlling timing used to control the feeding unit 200 and the recording unit 100 are switched in order to be matched with the application of this higher supply voltage. As a result, both the drive means A and B of the recording unit 100 can be operated at high speed, and furthermore the recording means R can be driven in the high resolution printing mode in which the dot density per unit (i.e., recording density) is increased, without taking any care of power consumption.

Accordingly, once the feeding unit 200 is connected to the host apparatus, the recording unit 100 may be operated as the recording apparatus equipped with the ASF function by being merely connected to the feeding unit 200 without any wiring connections. Therefore, it is possible to provide such an easy operable recording apparatus.

Figure 4:
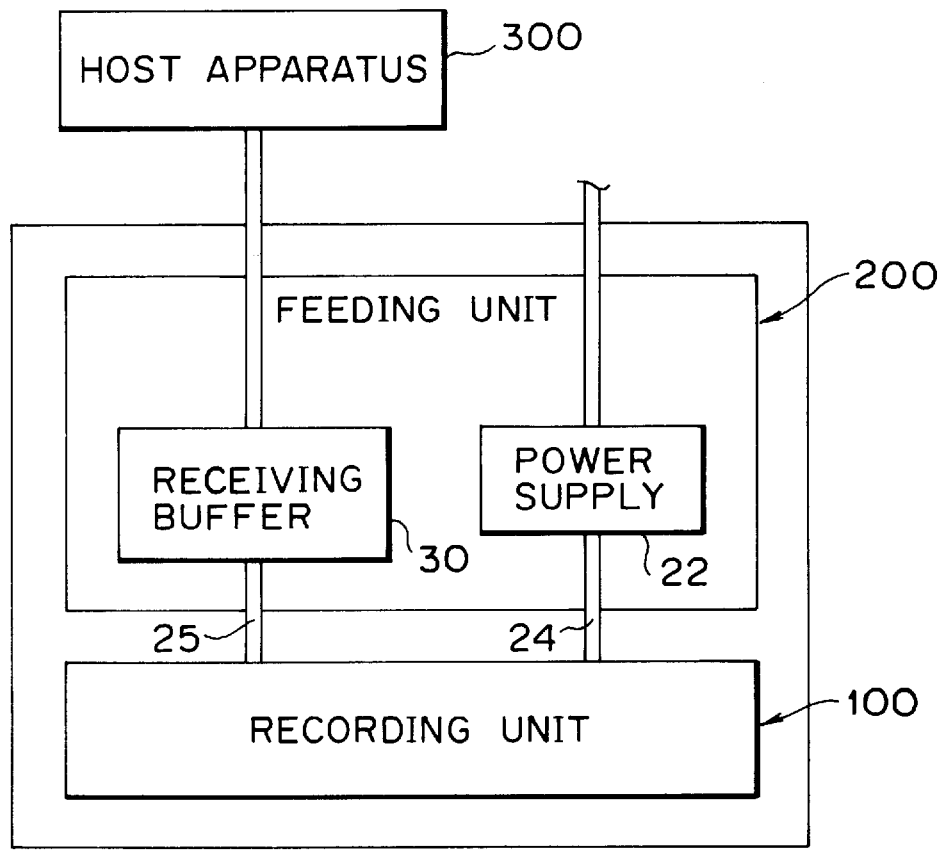
FIG. 4 is a schematic block diagram for showing a circuit arrangement according to a second embodiment of the present invention.

FIG. 4 schematically indicates an arrangement of an ink jet type recording apparatus according to a second embodiment of the present invention. The second embodiment is so arranged that a receiving buffer 30 is employed, and the recording signal is supplied via this receiving buffer 30 to the recording unit 100, although the above-described first embodiment is so constructed that the feeding unit 200 merely supplies/receives the recording signal derived from the host apparatus to/from the recording unit 100. As a consequence, even when the recording speed of the recording unit is slower than the input speed of the recording signal from the host apparatus 300, the recording operation can be performed without waiting for the recording signal supplied from the host apparatus 300.

Figure 5:
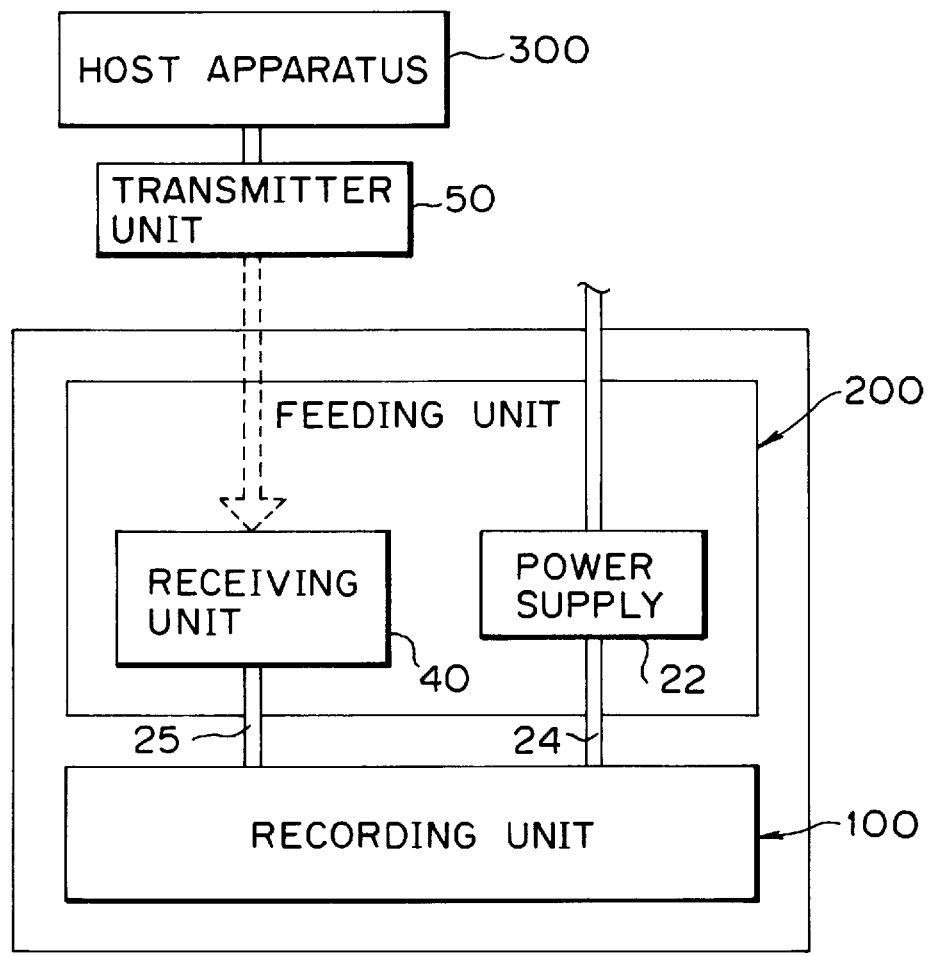
FIG. 5 is a schematic block diagram for indicating a circuit arrangement according to a third embodiment of the present invention.
Figure 6:
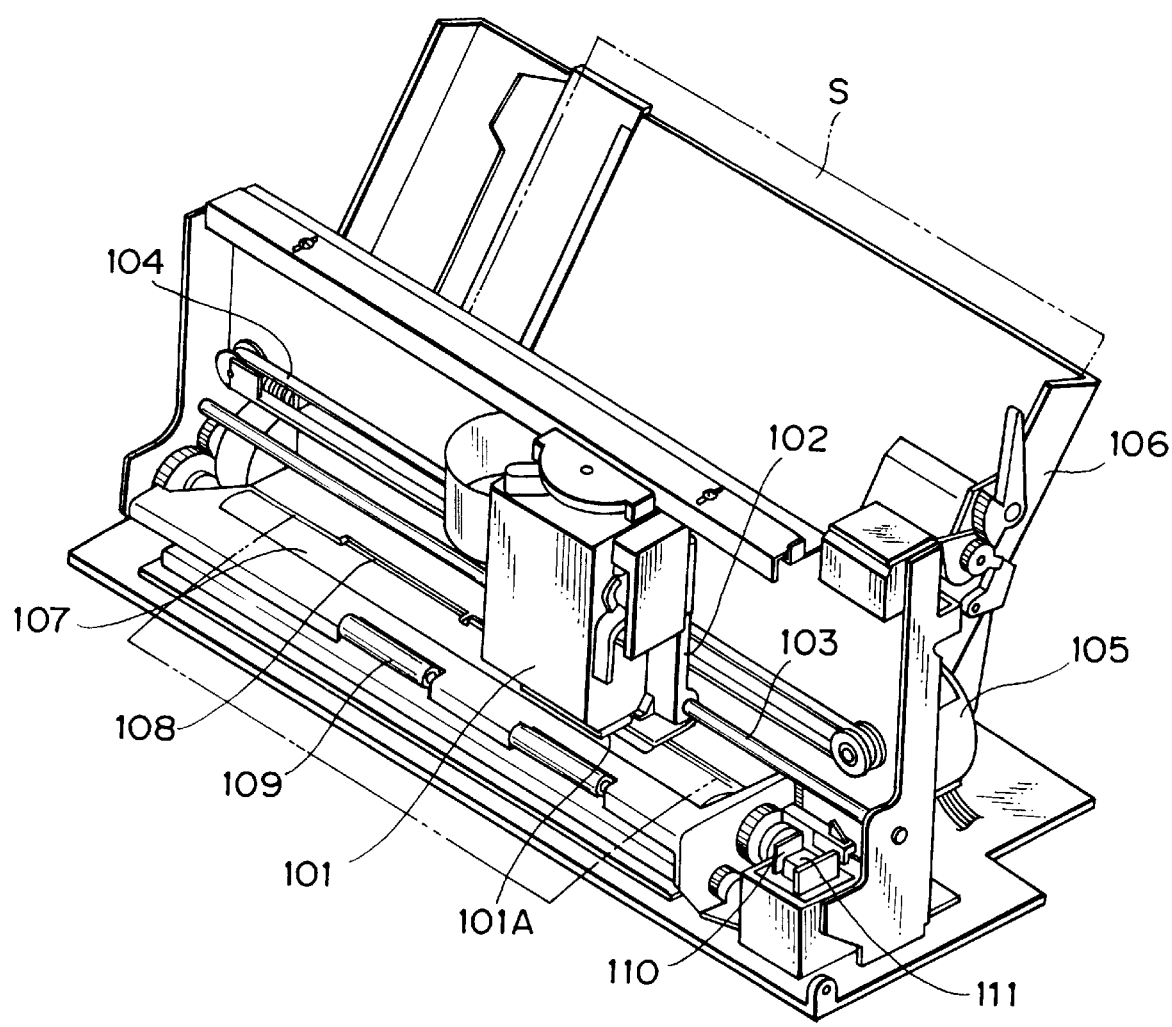
FIG. 6 is a perspective view for showing a structural example of the conventional ink jet type recording apparatus.
Figure 7:
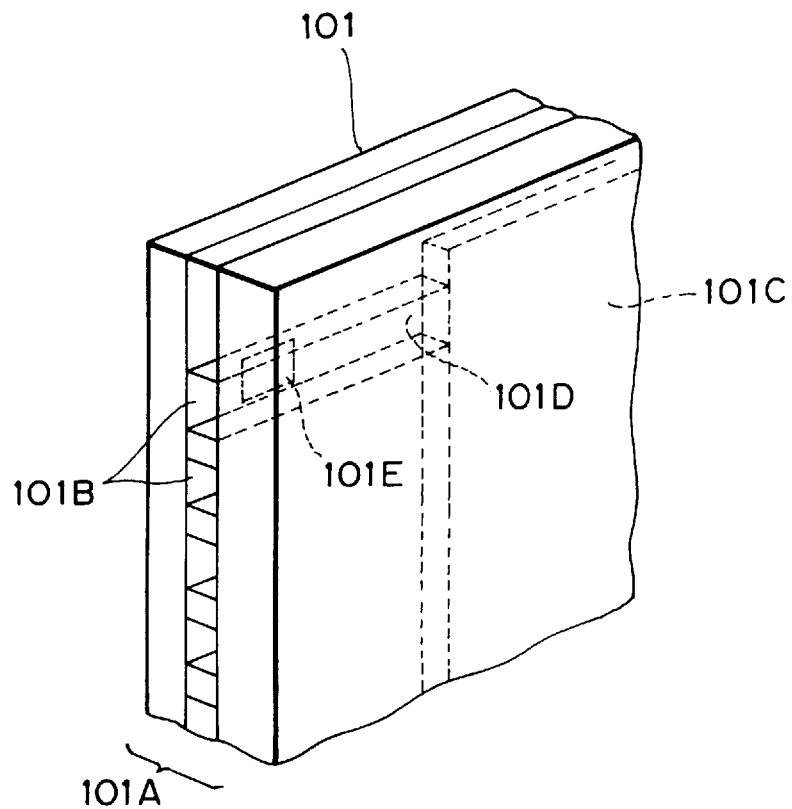
FIG. 7 is a perspective view for transparently showing the structure of the ink jetting unit of the conventional recording head.
Figure 8:
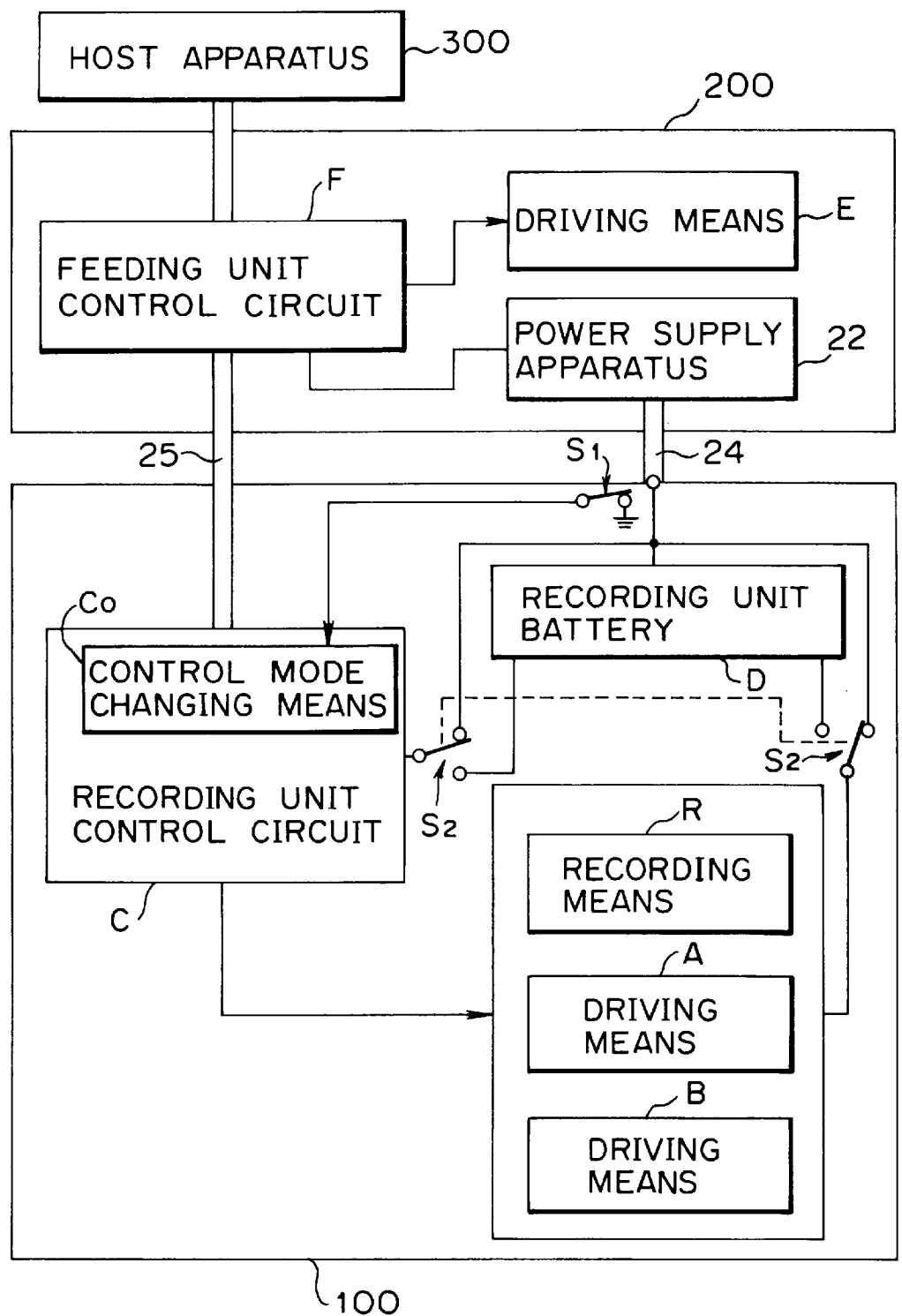
FIG. 8 is a schematic block diagram for representing a structure of the ink jet type recording apparatus according to the first embodiment of the present invention.

FIG. 5 schematically shows an arrangement of an ink jet type recording apparatus according to a third embodiment of the present invention. The third embodiment is featured such that a radio signal receiving unit 40 is provided with the feeding unit 200, and transmitter unit 50 is installed on the host apparatus 300, so that the receiving unit 40 receives the recording signal transmitted from this transmitter unit 50 in the form of the radio signal.

Although not shown in a drawing, another embodiment may be realized according to the present invention. That is, an arrangement of this embodiment is substantially the same as that of the first embodiment. When the recording unit 100 is mounted on the feeding unit 200, the power supply for the recording unit 100 is merely changed from the recording unit battery D to the power supply apparatus 22 of the feeding unit 200 without recharging the recording unit battery D. This switching operation may be realized by employing a relay, or an electronic switch such as a semiconductor device. To this end, the recharging line shown in FIG. 8 may be omitted. It should be noted the recording unit battery D may be recharged by the above described constant voltage supply apparatus connected to the household AC power line in this case.

It should also be noted that although the above-explained feeding unit 200 feeds a single sheet, this feeding unit 200 may feed a continuous sheet.

In the above-explained embodiments, the descriptions have been made of the monochromatic ink jet type recording apparatuses equipped with a single recording head 1 mounted on the carriage 2. Alternatively, the basic idea of the present invention may be similarly applied to various types of ink jet recording apparatuses, for instance, a color ink jet type recording apparatus using a plurality of recording heads capable of recording in different color inks, and a gradation recording type ink jet recording apparatus with employment of a plurality of same color recording heads with different gradation. As a result, a similar effect to the above effect may be achieved.

Furthermore, various modifications may be made as the recording head 1. For example, a cartridge type recording head may be employed which is constructed of a recording head and an ink tank in an integral form. Another recording head may be arranged in such a manner that a recording head is separately provided with an ink tank, and these components are connected to each other by using an ink supply tube. Moreover, the structures of the recording means and the ink tank may be modified. Additionally, the present invention is not limited to the above-described recording method, but may be freely modified.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system, are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus comprising:
   a recording unit including means for performing a recording operation on a recording material in response to a recording signal, and a power supply for supplying power to drive said means;
   a feeding unit including means for automatically feeding the recording material to said recording unit, said feeding unit being detachably connected to said recording unit; and
   a power supply apparatus installed on said feeding unit, capable of supplying power to said recording unit under such a condition that said feeding unit is connected to said recording unit.

2. A recording apparatus as claimed in claim 1, wherein said power supply of said recording unit comprises a battery, and said power supply apparatus comprises a battery, a capacity of which is larger than that of said recording unit battery.

3. A recording apparatus as claimed in claim 1, wherein said power supply apparatus comprises a constant voltage supply apparatus whose supply voltage is controlled to a predetermined constant voltage by an AC-to-DC converter connected to a household AC power source.

4. A recording apparatus as claimed in claim 1, further comprising switching means for changing a power supply for said recording operation performing means from the power supply of said recording unit to said power supply apparatus of said feeding apparatus under the condition that said feeding unit is connected to said recording unit.

5. A recording apparatus as claimed in claim 2, further comprising recharging means for recharging the battery of said recording unit by the power supply apparatus of said feeding unit under the connecting condition between said recording unit and said feeding unit.

6. A recording apparatus as claimed in claim 1, further comprising recording operation mode switching means for switching between a first recording operation mode under which said recording unit is solely utilized, and a second recording operation mode under which said recording unit is used together with the feeding unit under the connecting condition between said recording unit and said feeding unit.

7. A recording apparatus as claimed in claim 6, wherein said recording operation mode switching means changes a recording speed.

8. A recording apparatus as claimed in claim 6, wherein said recording operation mode switching means changes recording density.

9. A recording apparatus as claimed in claim 1, further comprising means for receiving a signal derived from a host apparatus for said recording unit under the connecting condition between said feeding unit and said recording unit.

10. A recording apparatus as claimed in claim 9, wherein said feeding unit comprises a receiving buffer for temporarily storing the signal derived from the host apparatus.

11. A recording apparatus as claimed in claim 10, wherein said means for receiving the signal derived from said host apparatus for said recording unit comprises a receiving unit for receiving said signal in the form of a radio signal.

12. A recording apparatus as claimed in claim 1, wherein said feeding unit comprises a tractor feeder.

13. A recording apparatus as claimed in claim 1, wherein said recording unit performs the recording operation with an ink jet recording head for ejecting ink onto the recording material.

14. A recording apparatus as claimed in claim 13, wherein said ink jet recording head comprises an electrothermal converting member for producing heat energy used to eject the ink.

15. A recording apparatus as claimed in claim 14, wherein said ink jet recording head ejects the ink from ink ejecting orifices by utilizing film boiling occurring in the ink in response to the heat energy produced by said electrothermal converting member.

16. A recording apparatus comprising:
a feeding unit for feeding a recording material, said feeding unit comprising a power supply portion and an output portion for outputting power from said power supply portion to outside of said feeding unit; and
a recording unit detachably connected to said feeding unit, said recording unit being capable of performing a recording operation on the recording material fed by said feeding unit using power supplied from said power supply portion through said output portion when connected to said feeding unit.

17. A recording apparatus as claimed in claim 16, wherein said recording unit receives the power supplied from said power supply portion when connected to said feeding unit and further comprises a power storing portion for storing power which is used for driving said recording unit when disconnected from said feeding unit.

18. A recording apparatus as claimed in claim 17, wherein said power storing portion of said recording unit comprises a battery, and said power supply portion of said feeding unit comprises a battery, a supply voltage of which is higher than that of said recording unit battery, and a capacity of which is larger than that of said recording unit battery.

19. A recording apparatus as claimed in claim 17, wherein said power supply portion of said feeding unit comprises a constant voltage supply apparatus whose supply voltage is controlled to a predetermined constant voltage by an AC-to-DC converter connected to a household AC power source.

20. A recording apparatus as claimed in claim 17, further comprising switching means for changing a power supply for said recording unit from said power storing portion of said recording unit to said power supply portion of said feeding unit under a condition that said feeding unit is connected to said recording unit.

21. A recording apparatus as claimed in claim 18, further comprising recharging means for recharging the battery of said recording unit by the power supply portion of said feeding unit under a connecting condition between said recording unit and said feeding unit.

22. A recording apparatus as claimed in claim 17, further comprising recording operation mode switching means for switching between a first recording operation mode under which said recording unit is solely utilized, and a second recording operation mode under which said recording unit is used together with the feeding unit under a connecting condition between said recording unit and said feeding unit.

23. A recording apparatus as claimed in claim 22, wherein said recording operation mode switching means changes a recording speed.

24. A recording apparatus as claimed in claim 22, wherein said recording operation mode switching means changes a recording density.

25. A recording apparatus as claimed in claim 17, further comprising means for receiving a signal from a host apparatus for said recording unit under a connecting condition between said recording unit and said feeding unit.

26. A recording apparatus as claimed in claim 25, wherein said feeding unit comprises a receiving buffer for temporarily storing the signal from the host apparatus.

27. A recording apparatus as claimed in claim 26, wherein said means for receiving a signal from the host apparatus for said recording unit comprises a receiving unit for receiving said signal in the form of a radio signal.

28. A recording apparatus as claimed in claim 17, wherein said feeding unit comprises a tractor feeder.

29. A recording apparatus as claimed in claim 17, wherein said recording unit performs the recording operation with an ink jet recording head for ejecting ink onto the recording material.

30. A recording apparatus as claimed in claim 29, wherein said ink jet recording head comprises an electrothermal converting member for producing heat energy used to eject the ink.

31. A recording apparatus as claimed in claim 30, wherein said ink jet recording head ejects the ink from ink ejecting orifices by utilizing film boiling occurring in the ink in response to the heat energy produced by said electrothermal converting member.

32. A feeding unit detachably connected to a recording unit having a power storing portion for storing power to perform a recording operation on a recording material, comprising:
a feeding portion for feeding the recording material, said feeding portion feeding the recording material to said recording unit under a condition that said feeding unit is connected to the recording unit;

a power supply portion for supplying power for driving the recording unit to the power storing portion under the connecting condition between said feeding unit and said recording unit; and an output portion for outputting the power from said power supply portion to outside of said feeding unit, said output portion outputting the power of said power supply portion to the power storing portion under the connecting condition between said feeding unit and the recording unit.

33. A feeding unit as claimed in claim 32, wherein the power storing portion of said recording unit comprises a battery, and said power supply portion of said feeding unit comprises a battery, a supply voltage of which is higher than that of the recording unit battery, and a capacity of which is larger than that of the recording unit battery.

34. A feeding unit as claimed in claim 32, wherein said power supply portion of said feeding unit comprise a constant voltage supply apparatus whose supply voltage is controlled to a predetermined constant voltage by an AC-to-DC converter connected to a household AC power source.

35. A feeding unit as claimed in claim 32, further comprising switching means for changing a power supply for the recording unit from the power storing portion of the recording unit to said power supply portion of said feeding unit under the condition that said feeding unit is connected to the recording unit.

36. A feeding unit as claimed in claim 33, further comprising recharging means for recharging the battery of the recording unit by said power supply portion of said feeding unit under the connecting condition between the recording unit and said feeding unit.

37. A feeding unit as claimed in claim 32, further comprising means for receiving a signal from a host apparatus for the recording unit under the connecting condition between the recording unit and said feeding unit.

38. A feeding unit as claimed in claim 37, further comprising a receiving buffer for temporarily storing the signal from the host apparatus.

39. A feeding unit as claimed in claim 38, wherein said means for receiving a signal from the host apparatus for the recording unit comprises a receiving unit for receiving the signal in the form of a radio signal.

40. A feeding unit as claimed in claim 32, wherein said feeding portion comprises a tractor feeder.

41. A recording unit detachably connected to a feeding unit having a feeding portion for feeding a recording material, a power supply portion and an output portion for outputting power from the power supply portion to outside of the feeding unit, comprising:

a recording portion for recording on the recording material, said recording portion performing a recording operation on the recording material fed by the feeding unit under a condition that the feeding unit is connected to said recording unit; and a power storing portion for storing power for recording on the recording material, wherein said recording unit is capable of performing the recording operation on the recording material fed by the feeding unit using the power supplied from the power supply portion through the output portion under the condition that the feeding unit is connected to said recording unit.

42. A recording unit as claimed in claim 41, wherein said power storing portion of said recording unit comprises a battery, and the power supply portion of the feeding unit comprises a battery, a supply voltage of which is higher than that of said recording unit battery, and a capacity of which is larger than that of said recording unit battery.

43. A recording unit as claimed in claim 41, further comprising switching means for changing a power supply for said recording portion from said power storing portion of said recording unit to the power supply portion of the feeding unit under the condition that the feeding unit is connected to said recording unit.

44. A recording unit as claimed in claim 42, further comprising recharging means for recharging the battery of said recording unit by the power supply portion of the feeding unit under the connecting condition between said recording unit and the feeding unit.

45. A recording unit as claimed in claim 41, further comprising recording operation mode switching means for switching between a first recording operation mode under which said recording unit is solely utilized, and a second recording operation mode under which said recording unit is used together with the feeding unit under the connecting condition between said recording unit and the feeding unit.

46. A recording unit as claimed in claim 45, wherein said recording operation mode switching means changes a recording speed.

47. A recording unit as claimed in claim 45, wherein said recording operation mode switching means changes a recording density.

48. A recording unit as claimed in claim 41, wherein said recording portion performs the recording operation with an ink jet recording head for ejecting ink onto the recording material.

49. A recording unit as claimed in claim 48, wherein said ink jet recording head comprises an electrothermal converting member for producing heat energy used to eject the ink.

50. A recording unit as claimed in claim 49, wherein said ink jet recording head ejects the ink from ink ejecting orifices by utilizing film boiling occurring in the ink in response to the heat energy produced by said electrothermal converting member.

51. A feeding unit detachably connected to a recording unit having a power receiving portion for receiving power to perform a recording operation on a recording material, comprising:

a feeding portion for feeding the recording material, said feeding portion feeding the recording material to said recording unit under a condition that said feeding unit is connected to the recording unit;

a power supply portion for supplying power for driving the recording unit to the power receiving portion under the connecting condition between said feeding unit and said recording unit; and an output portion for outputting the power from said power supply portion to outside of said feeding unit, said output portion outputting the power of said power supply portion to the power receiving portion under the connecting condition between said feeding unit and the recording unit.

52. A feeding unit as claimed in claim 51, wherein the power receiving portion of said recording unit comprises a battery, and said power supply portion of said feeding unit comprises a battery, a supply voltage of which is higher than that of the recording unit battery, and a capacity of which is larger than that of the recording unit battery.

53. A feeding unit as claimed in claim 51, wherein said power supply portion of said feeding unit comprise a constant voltage supply apparatus whose supply voltage is controlled to a predetermined constant voltage by an AC-to-DC converter connected to a household AC power source.

54. A feeding unit as claimed in claim 51, further comprising switching means for changing a power supply for the recording unit from the power receiving portion of the recording unit to said power supply portion of said feeding unit under the condition that said feeding unit is connected to the recording unit.

55. A feeding unit as claimed in claim 52, further comprising recharging means for recharging the battery of the recording unit by said power supply portion of said feeding unit under the connecting condition between the recording unit and said feeding unit.

56. A feeding unit as claimed in claim 51, further comprising means for receiving a signal from a host apparatus for the recording unit under the connecting condition between the recording unit and said feeding unit.

57. A feeding unit as claimed in claim 56, further comprising a receiving buffer for temporarily storing the signal from the host apparatus.

58. A feeding unit as claimed in claim 57, wherein said means for receiving a signal from the host apparatus for the recording unit comprises a receiving unit for receiving the signal in the form of a radio signal.

59. A feeding unit as claimed in claim 51, wherein said feeding portion comprises a tractor feeder.

60. A recording unit detachably connected to a feeding unit having a feeding portion for feeding a recording material, a power supply portion and an output portion for outputting power from the power supply portion to outside of the feeding unit, comprising:

a recording portion for recording on the recording material, said recording portion performing a recording operation on the recording material fed by the feeding unit under a condition that the feeding unit is connected to said recording unit; and a power receiving portion for receiving power for recording on the recording material, wherein said recording unit is capable of performing the recording operation on the recording material fed by the feeding unit using the power supplied from the power supply portion through the output portion under the condition that the feeding unit is connected to said recording unit.

61. A recording unit as claimed in claim 60, wherein said power receiving portion of said recording unit comprises a battery, and the power supply portion of the feeding unit comprises a battery, a supply voltage of which is higher than that of said recording unit battery, and a capacity of which is larger than that of said recording unit battery.

62. A recording unit as claimed in claim 60, further comprising switching means for changing a power supply for said recording portion from said power receiving portion of said recording unit to the power supply portion of the feeding unit under the condition that the feeding unit is connected to said recording unit.

63. A recording unit as claimed in claim 61, further comprising recharging means for recharging the battery of said recording unit by the power supply portion of the feeding unit under the connecting condition between said recording unit and the feeding unit.

64. A recording unit as claimed in claim 60, further comprising recording operation mode switching means for switching between a first recording operation mode under which said recording unit is solely utilized, and a second recording operation mode under which said recording unit is used together with the feeding unit under the connecting condition between said recording unit and the feeding unit.

65. A recording unit as claimed in claim 64, wherein said recording operation mode switching means changes a recording speed.

66. A recording unit as claimed in claim 64, wherein said recording operation mode switching means changes a recording density.

67. A recording unit as claimed in claim 60, wherein said recording portion performs the recording operation with an ink jet recording head for ejecting ink onto the recording material.

68. A recording unit as claimed in claim 67, wherein said ink jet recording head comprises an electrothermal converting member for producing heat energy used to eject the ink.

69. A recording unit as claimed in claim 68, wherein said ink jet recording head ejects the ink from ink ejecting orifices by utilizing film boiling occurring in the ink in response to the heat energy produced by said electrothermal converting member.

\* \* \* \* \*